United States Patent [19]

Sashiki

[11] Patent Number: 4,497,385
[45] Date of Patent: Feb. 5, 1985

[54] COMBINATORIAL WEIGHING APPARATUS

[75] Inventor: Takashi Sashiki, Nagaokakyo, Japan

[73] Assignee: Kabushiki Kaisha Ishida Koki Seisakusho, Kyoto, Japan

[21] Appl. No.: 409,298

[22] Filed: Aug. 18, 1982

[30] Foreign Application Priority Data

Aug. 18, 1981 [JP] Japan .............................. 56-122914[U]
Aug. 18, 1981 [JP] Japan .............................. 56-122915[U]
Sep. 4, 1981 [JP] Japan .............................. 56-132244[U]

[51] Int. Cl.³ .................................................. G01D 19/32
[52] U.S. Cl. ........................................ 177/59; 177/244
[58] Field of Search ................ 177/25, 59, 244, 58, 177/55, 105

[56] References Cited

U.S. PATENT DOCUMENTS 2,031,708  2/1936  Hannewald ...................... 177/58 X
3,108,647 10/1963  Harmon .............................. 177/55 X
4,398,612  8/1983  Mikami ............................... 177/58 X Primary Examiner—Joseph W. Hartary
Attorney, Agent, or Firm—Staas & Halsey

[57] ABSTRACT

A combinatorial weighing apparatus has a distribution table adapted to distribute a material to be weighed and supplied thereto, a plurality of distribution supply devices arranged radially around the distribution table and adapted to receive the material distributed by the distribution table, hoppers disposed below respective distribution supply devices and adapted to receive the material from the distribution supply devices, weight sensors annexed to said hoppers and adapted to weigh the material in respective hoppers, computing means adapted to compute the total weight of the material and to select the best combination of hoppers which provides a total weight most closely approximating a preset target weight, and a hopper drive means adapted to selectively drive the hoppers to make the hoppers constituting the selected best combination discharge the material therefrom. The hopper drive means is disposed so as to be surrounded by the hoppers. The apparatus has a single disc-shaped feeder base common to all distribution supply devices. The distribution supply devices are arranged on the common feeder base radially at a regular interval.

13 Claims, 15 Drawing Figures

Fig. 1 (PRIOR ART)
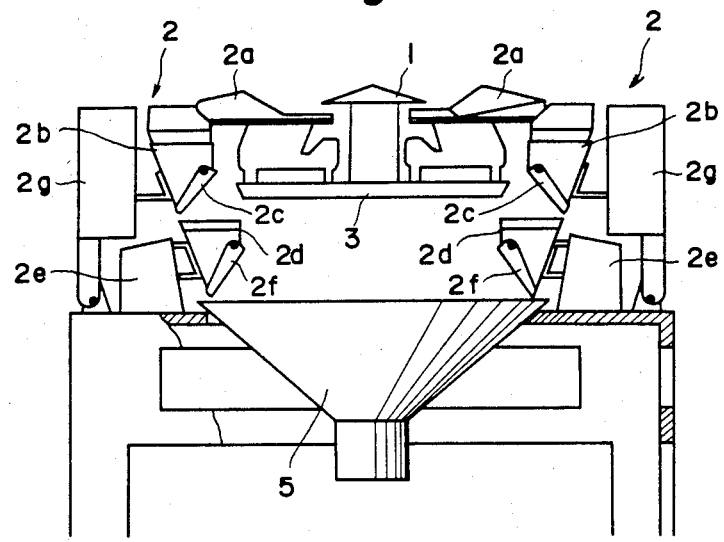
Fig. 3 (PRIOR ART)
Fig. 2 (PRIOR ART)
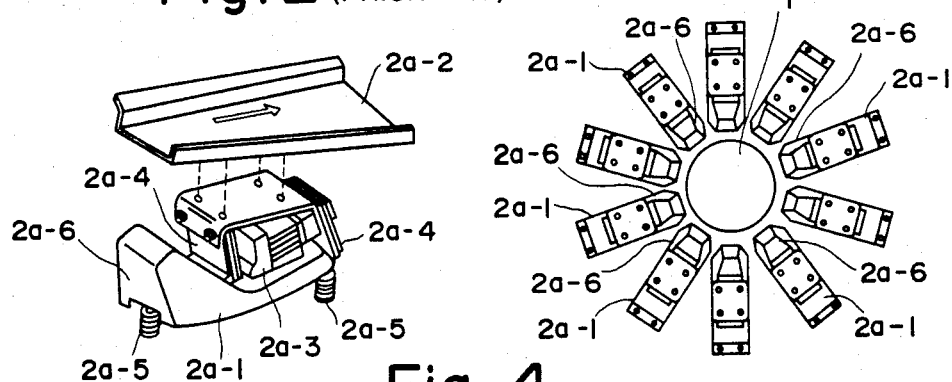
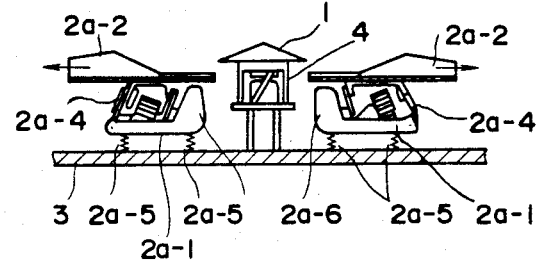
Fig. 4 (PRIOR ART)

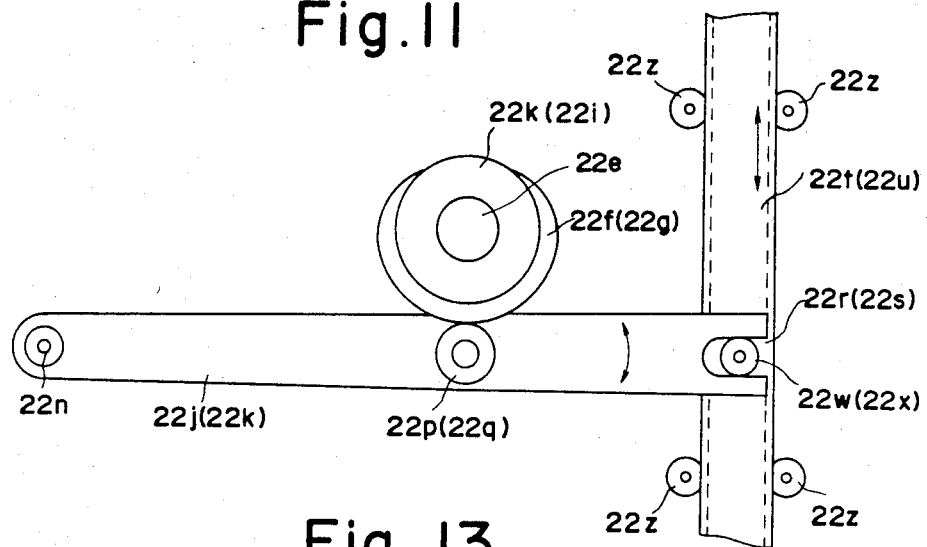
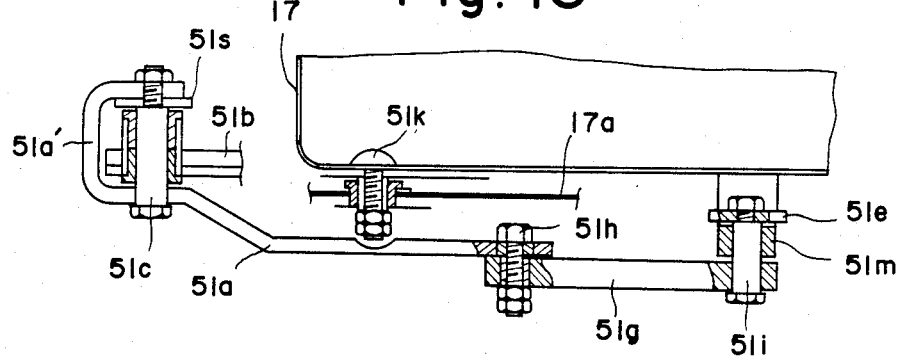
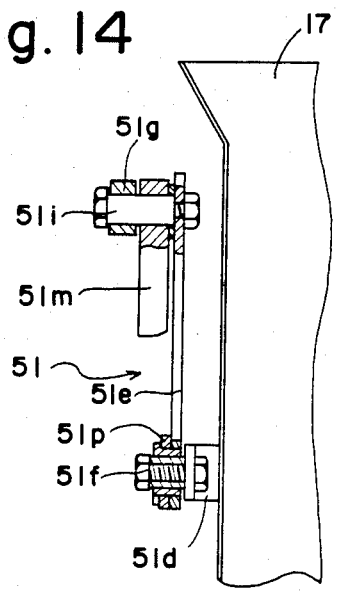

COMBINATORIAL WEIGHING APPARATUS

BACKGROUND OF THE INVENTION

The present invention relates to a combinatorial weighing apparatus and, more particularly, to a combinatorial weighing apparatus of the type having a plurality of weighing hoppers and adapted for weighing materials through the steps of finding the weight of a batch of material in each weighing hopper, selecting the combination of weighing hoppers which gives a total weight equal to or closest to a preset target weight (referred to as the "best" combination, hereinunder) and discharging the batches of material from the weighing hoppers constituting the selected combination.

Generally, a combined weighing apparatus incorporating a computer, referred to as "computer scale", is used for accurately weighing materials which exhibit large variation in weight from one to another, e.g. fruits and vegetables, confectionaries, fabricated articles, perishables or the like.

In such a combinatorial weighing apparatus, batches of the material to be weighed are put into a plurality of weighing hoppers and weighed in respective hoppers. Then, the apparatus selects a combination of batches which provides a total weight closest to the target weight within a predetermined tolerance. The batches constituting the selected combination are then discharged and the evacuated weighing hoppers are charged with new batches of the material for the next cycle of the weighing operation. This operation is repeated to achieve the automatic weighing of the material.

Referring to prior art FIG. 1 schematically showing the mechanism of a combinatorial weighing apparatus, a distribution table 1 is adapted to disperse the material to be weighed in the radial direction and to distribute the dispersed batches of material to a plurality of weighing stations 2 arranged radially around the distribution table 1. The distribution table 1 is adapted to be vibrated by a vibrator or the like, so that the dispersed material is distributed to the weighing stations 2 as a result of the vibration of the table for a predetermined time length. In the illustrated embodiments, n weighing stations are arranged, and each weighing station 2 includes a distribution supply device 2a, pool hopper 2b, pool hopper gate 2c, weighing hopper 2d, weight sensor 2e, weighing hopper gate 2f and a hopper drive unit 2g. As shown in FIG. 2, the distribution supply device 2a is composed of a feeder base 2a-1 having a predetermined shape and a trough 2a-2 mounted on the feeder base 2a-1 through an electromagnet 2a-3 and a leaf spring 2a-4. As will be seen from FIGS. 3 and 4, a plurality of feeder bases 2a-1 are carried by a circular support member 3 through respective coiled springs 2a-5 and are arranged radially along the outer periphery of the distribution table 1. In operation, the material to be weighed is put on the distribution table 1 while the latter is vibrated reciprocatingly and spirally by an electromagnetic vibrator 4, so that the material is dispersed radially outwardly along the conical top surface of the distribution table 1 into separate batches which in turn are delivered to respective troughs 2a-9. The batch of material supplied to each trough 2a-2 is conveyed through the latter in the direction of the arrow as a result of a linear reciprocating vibration of the trough 2a-2 by the electromagnet 2a-3, and is put into the pool hopper 2b (FIG. 1) from the end of the trough 2a-2.

Referring back to FIG. 1, each pool hopper 2b is provided with a pool hopper gate 2c. As this pool hopper gate 2c is opened by the operation of the hopper drive unit 2g, the batch of material contained by the pool hopper 2b is put into the weighing hopper 2d. Each weighing hopper 2d is provided with a weight sensor 2e for weighing the batch of material put into the weighing hopper 2d. The output from the weight sensors 2e are delivered to a combination controlling section (not shown) which selects the best combination of the batches of material which provides a total weight most closely approximating the target weight within a predetermined tolerance. Each weighing hopper 2d is provided with a weighing hopper gate 2f. After the selection of the best combination, only the weighing hopper gates 2f of the weighing hoppers constituting the best combination are opened to let the batches of material go out of these hoppers. These batches of material are then collected at the lower central portion of the weighing apparatus through a collecting chute 5. The collecting chute 5 has a form resembling a conical funnel, and the batches of material dropping onto the peripheral portions of the chute are gathered at the central portion thereof naturally by the force of gravity or forcibly by a scraping means (not shown) or the like.

At the initial stage of the weighing operation, the weighing hoppers 2d are charged with respective batches of material to be weighed. The weight sensors 2e annexed to these weighing hoppers 2d weigh the batches of material and deliver weight signals $L_1$ to $L_{10}$ to the combination control section which is not shown. The combination control section then makes a computation of total weight for various hopper combinations and selects a combination which provides a total weight most closely approximating the target weight within a predetermined tolerance. The hopper drive unit 2g then opens the weighing hopper gates of the weighing hoppers constituting the selected best combination. In consequence, the batches of material providing the best combination are discharged from these hoppers 2d into the collecting chute 5. Then, the pool hopper gates 2c are opened to charge the evacuated weighing hoppers with new batches of material. At the same time, the distribution supply devices 2a corresponding to the evacuated pool hoppers 2b are vibrated for a predetermined time to charge the empty pool hoppers 2b with the material to be weighed. Then, the selection of the best combination is made in the same manner as that explained before. The weighing operation by the combinatorial weighing apparatus is thus performed repeatedly and continuously.

In the combinatorial weighing apparatus of the type mentioned above, it is essential that the supply and discharge of the materials to and from sections such as pool hoppers 2b, weighing hoppers 2d or the like have to be made independently without being interfered with by other sections. In the conventional combinatorial weighing apparatus, therefore, a plurality of drive units 2g are installed independently outside respective sections such as pool hoppers, weighing hoppers or the like, to ensure smooth supply and discharge of the material to and from respective sections.

According to this arrangement, however, the number of parts is increased impractically and the efficiency of use of power is lowered undesirably because a multiplicity of drive units 2g are arranged around respective sections such as pool hoppers 2b and weighing hoppers 2d. In addition, since the drive units 2g are arranged at the outer side of the pool hoppers 2b and the weighing hoppers 2d, the apparatus as a whole is projected radially outwardly requiring a larger installation space. The hoppers tend to be contaminated by deposition of the weighed material and, hence, have to be cleaned frequently. These hoppers, however, are not easy to access because of the presence of the hopper drive units 2g around these hoppers. Namely, troublesome work is required to demount the drive units at each time of the cleaning and this lowers the efficiency of the work.

The feeder base 2a-1 (See FIGS. 2 thru 4) can translate the vibration of the electromagnet 2a-3 effectively to the trough 2a-2 when its weight is large. It is, therefore, necessary to increase the weight of the feeder base 2a-1 as much as possible. In the distribution supply device 2a in the known combinatorial weighing apparatus, therefore, a weight 2a-6 is mounted so that the center of gravity is positioned at the rear part of the feeder base, i.e. at the end portion of the same close to the distribution table 1. The distribution supply devices 2a, each having the weights 2a-6, are arranged radially around the distribution table 1 independently of one another. The condition for the mounting of a multiplicity of distribution supply devices 2a around the distribution table 1 is that the weights 2a-6 of adjacent feeder bases do not interfere each other. For this reason, in the known combinatorial weighing apparatus, it is not possible to arrange a multiplicity of distribution devices 2a densely around the distribution table 1. Furthermore, since the distribution devices 2a are mounted on the support 3 (See FIG. 4) independently, the number of supporting members such as coiled springs is increased to raise the cost of the weighing apparatus as a whole.

BRIEF SUMMARY OF THE INVENTION

Accordingly, an object of the invention is to provide a combinatorial weighing apparatus which is improved to reduce the size and to facilitate maintenance work such as cleaning.

Another object of the invention is to provide a combinatorial weighing apparatus which is improved to reduce the number of parts and to lower the production cost.

Still another object of the invention is to provide a combinatorial weighing apparatus which is improved to increase the power efficiency in the hopper drive unit.

To these ends, according to the invention, there is provided a combinatorial weighing apparatus comprising a plurality of pool hoppers and a plurality of weighing hoppers arranged radially. The improvement comprises that hopper drive units for driving the pool hopper gates and the weighing hopper gates are disposed in the spaces defined by the pool hoppers and the weighing hoppers or, alternatively, a combinatorial weighing apparatus comprising a disc-shaped feeder base common to all distribution supply devices, the feeder base being mounted on a hopper drive unit, and a plurality of electromagnetic feeders arranged radially on the outer peripheral surface of the feeder base at a constant pitch, each electromagnetic feeder having a radial trough.

Other features and advantages of the invention will be apparent from the following description taken in conjunction with the accompanying drawings.

BRIEF DESCRIPTION OF THE DRAWINGS

FIGS. 1 to 4 are schematic illustrations of a conventional weighing apparatus;

FIGS. 5 to 11 are illustrations of a combinatorial weighing apparatus in accordance with the invention;

FIG. 13 is a partly-sectioned plan view of the mechanism shown in FIG. 12; and

FIG. 14 is a partly-sectioned side elevational view of the mechanism shown in FIG. 12.

DESCRIPTION OF THE PREFERRED EMBODIMENT

Figure 5:
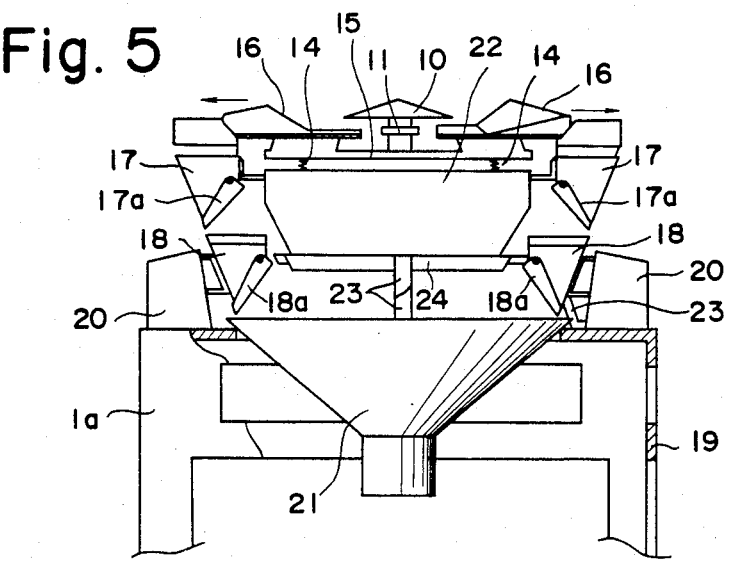
Figure 6:
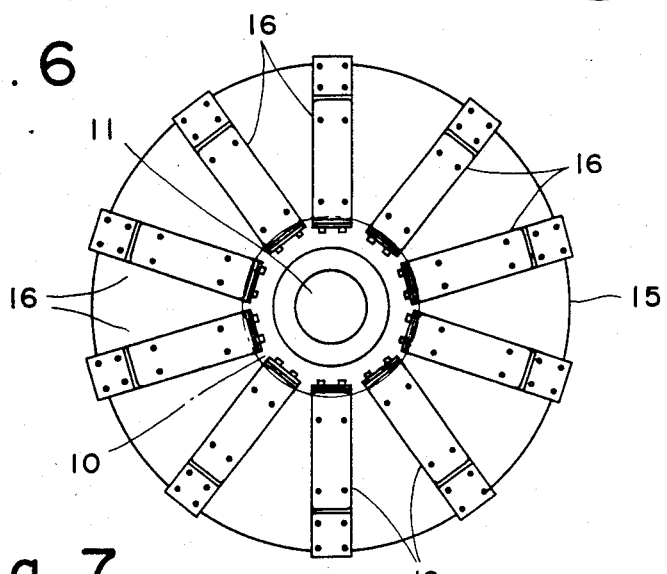
Figure 7:
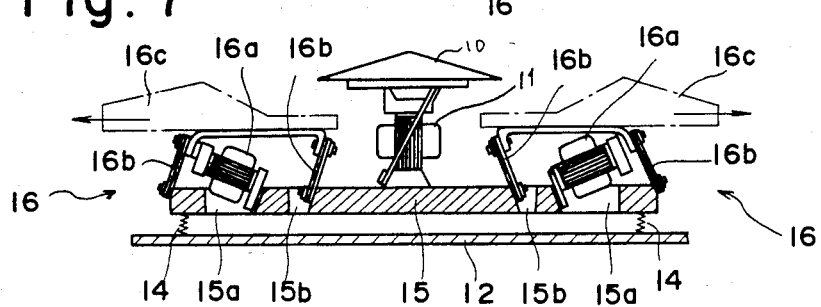
Figure 8:
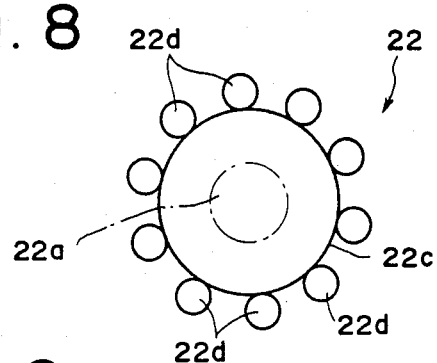
Figure 9:
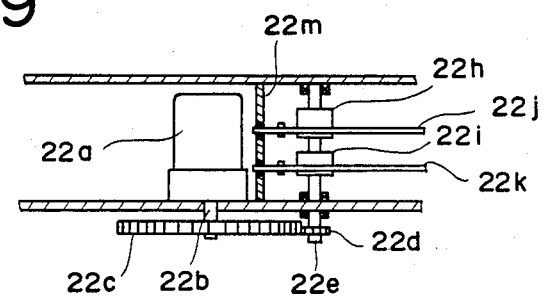
Figure 10:
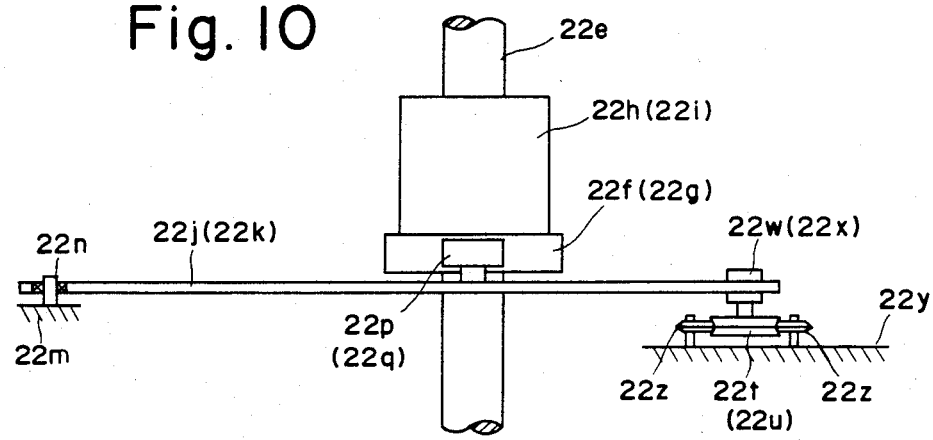

Referring to FIGS. 5 to 7, a conical distribution table 10 is mounted on an electromagnetic vibrator 11 and is adapted to be vibrated by the latter reciprocatingly and spirally.

A disc-shaped feeder base 15 is mounted through a plurality of coiled springs 14,14 on a support 12 (See FIG. 7) or on a hopper drive unit 22 (See FIG. 5). The electromagnetic vibrator 11 is carried by the central portion of the upper surface of the feeder base. A multiplicity of distribution supply devices 16 are arranged radially around the distribution table 10 and on the outer peripheral portion of the feeder base 15. In the illustrated embodiment, there are provided 10 distribution supply devices 16. Each distribution supply device 16 is provided with an electromagnet 16a and a leaf spring 16b fixed by suitable means in mounting holes 15a,15b, respectively, and a radial trough 16c mounted on the electromagnet 16a through a leaf spring 16b. The radially inner end portions of the radial trough 16c is positioned below the distribution table 10 without contacting the latter. The radially outer end portion of the radial trough 16c projects above a pool hopper 17 under which disposed is a weighing hopper 18. A multiplicity of weight sensors 20 are arranged at a constant pitch on the outer peripheral surface of the frame 19 of the weighing apparatus. A collecting chute 21 is disposed at the center of the space inside the frame 19, such that the upper open end thereof projects slightly above the upper surface of the frame 19. The hopper drive unit 22 is disposed above the top surface of the frame 19 within the space defined by the pool hoppers 17 and the weighing hoppers 18, and is adapted to open and close the pool hopper gates 17a and weighing hopper gate 18a through a lever mechanism which will be described later. The hopper drive unit 22 is supported through members such as a supporting leg 23, supporting base 24 and so forth. As stated before, a feeder base 15 is mounted on the upper surface of the hopper drive unit 22 through a plurality of coiled springs 14,14. The arrangement is such that, as the material to be weighed is put on the distribution table 10 of the combinatorial weighing apparatus having the described construction, the material to be weighed is dispersed bit by bit radially outwardly from the conical surface of the distribution table 10 as a result of a torsional reciprocating vibration of the electromagnetic vibrator 11 and is fed to the radial troughs 16c. The material is then conveyed through each trough 16c in the direction of the arrow 16c by a linear reciprocating vibration of the electromagnet 16a, as indicated by an arrow in FIG. 5. The material is then made to drop into the pool hopper 17 from the radially outer end of the radial trough 16c. The weighed material put into the pool hopper 17 is then passed to the weighing hopper 18 and is weighed by the weight sensor 20 annexed to this weighing hopper 18. The weight sensors 20 of all weighing hoppers produce and deliver signals representing the weights to a combination computing device (not shown) which makes a calculation of total weights of the material for various combinations of the weighing hoppers to select the best combination which approximates the preset target weight most closely within a predetermined tolerance. Then, the hopper drive unit 22 operates to actuate its lever mechanism to open and close only the weighing hopper gates 18a of the weighing hoppers 18 constituting the best combination, thereby to discharge the material from these weighing hoppers. The batches of the material thus discharged are put into the collecting chute 21 below these weighing hoppers 18 and the mass of material is then collected by a bucket conveyor which is not shown or put into a packing machine through a timing hopper which is also not shown.

As will be understood from the foregoing description, in the weighing apparatus shown in FIGS. 5 thru 7, the hopper drive unit 22 for opening and closing the gates 17a,18a of the pool hoppers 17 and weighing hoppers 18 are disposed in the space surrounded by these hoppers 17,18. It is, therefore, possible to reduce the installation space of the weighing apparatus as compared with conventional weighing apparatus in which a considerably large space is occupied by a plurality of drive units arranged around the body of the apparatus. In addition, since a plurality of distribution supply devices 16, each including an electromagnet 16a, leaf spring 16b and a radial trough 16c, are arranged radially on a common single feeder base 15, so that the feeder base can be held stably to eliminate the necessity for the weights which are required in the known apparatus to transmit effectively the vibration of the electromagnet to the trough.

FIGS. 8 to 11 show the details of the hopper drive unit in the combinatorial weighing apparatus in accordance with the invention. Referring to these figures, a geared motor 22a is mounted on the central portion of the hopper drive unit 22. A sun gear 22c is attached to the end of the drive shaft 22b of the geared motor 22a. A plurality of pinions (10 pinions in the illustrated embodiment) 22d are arranged at a constant circumferential pitch around the sun gear 22c in engagement with the latter. These pinions 22d are fixed to the ends of the transmission shafts 22e extending in parallel with the axis of the geared motor 22a. Numerals 22f and 22g denote cam plates which are secured to each transmission shaft 22e and spaced by a predetermined distance from each other in the axial direction. Clutch/brake mechanisms 22h and 22i are secured to one axial ends of the cam plates 22f,22g and fitted around the transmission shaft 22e. The arrangement is such that these clutch/brake mechanisms 22h,22i transmit the torque to respective cam plates 22f,22g in accordance with signals coming from a hopper drive controller. Photosensors (not shown) are adapted to sense the angular positions of the cam plates 22f,22g. As one cycle of operation is completed, the clutches of the clutch/brake mechanisms 22h,22i are turned off while the brakes of the same are put into effect thereby to repeatedly stop and start the cam plates 22f,22g at constant positions. Cam levers 22j,22k are pivotally secured through pins 22n to predetermined positions of a supporting plate 22m which are extended in parallel with the geared motor 22a. These levers 22j,22k are provided at their intermediate portions with cam followers 22p,22q which are made to contact with the outer peripheral surfaces of the cam plates 22f,22g, so that the cam levers 22j,22k are adapted to rock in accordance with the rotation of the cam plates 22f,22g. Elongated grooves 22r,22s (See FIG. 11) are formed in the other ends of the cam levers 22t,22y,22j. Retractable levers extending in the direction perpendicular to the cam levers 22j,22h have rollers 22w,22x received by the elongated grooves 22r,22s. The retractable levers are carried by a plurality of lever support members 22z on the top surface of a bottom plate 22y (See FIG. 10). The ends of the retractable levers 22t,22u are connected to the pool hopper gate 17a and the weighing hopper gates 18a, respectively. Namely, the arrangement is such that the rocking motion of the cam levers 22j,22k is changed into linear reciprocating motion of the retractable levers 22t,22u through rollers 22w,22x, and the pool hopper gate 17a and the weighing hopper gate 18a are opened and closed by the linear reciprocating motion of the retractable levers 22t,22u.

In operation, the material to be weighed is charged onto the distribution table 10 (See FIG. 5) of the combinatorial weighing apparatus and is distributed to the radial troughs 16c from which the material is further fed into the weighing hoppers 18 through the pool hoppers 17. The geared motor 22a of the hopper drive unit 22 mounted on the center of the body of the weighing apparatus is started simultaneously with the start of the weighing operation of the weighing apparatus. The driving power of the motor is therefore transmitted to the transmission shafts 22e through the sun gear 22c and the pinions 22d, thereby to rotatingly drive the trnasmission shafts 22e. As the material to be weighed is conveyed through the radial troughs 16c in the direction of the arrow shown in FIG. 5, two clutch/brake mechanisms 22h,22i on each transmission shaft 22e of the hopper drive unit 22 are made to operate in accordance with the signal coming from the hopper drive control device thereby to transmit the torque of the transmission shaft to the cam plates 22f,22g connected to one end of these clutch/brake mechanisms. Then, the cam levers 22j,22k having the cam followers 22p,22q always contacting the outer peripheral surface of the cam plates 22f,22g are made to rock around the pins 22n. In consequence, the retractable levers 22t,22u, connected to the ends of the cam levers 22j,22k through rollers 22w,22x, are made to reciprocate in the direction perpendicular to the direction of the cam levers 22j,22k. The linear reciprocating motion of the retractable levers 22t,22u is ensured by the presence of the support members 22z disposed at predetermined portions along the lateral sides of these levers. In consequence, the pool hopper gates 17a and the weighing hopper gates 18a connected to the ends of the retractable levers 22t,22u are made to open and close in accordance with the linear reciprocating motion of the retractable levers 22t,22u. As a result, batches of the material to be weighed, dropped from the ends of the radial troughs 16c, are supplied into the pool hoppers 17 and the batches of material which have been supplied to the pool hopper 17 are dropped into the weighing hopper 18 beneath the pool hopper 17. Then, signals representing the weights of batches of material in respective weighing hoppers are delivered by the weight sensors 20 to the combination computing device in which computation of total weight is computed to select the best combination which provides a total weight closest to the preset target weight. Then, the clutch/brake mechanisms $22h, 22i$ are operated on the basis of the selected combination, so that the gates $17a$ and $18a$ of the selected pool hoppers 17 and weighing hoppers 18 constituting the best combination are made to open by the linear reciprocating motion of the retractable levers $22t, 22u$. The weighed material is then dropped from each of these weighing hoppers into the collecting chute 21 under these hoppers and is further collected into a bucket conveyor which is not shown. Thereafter, the weighing hopper gates $18a$ are closed while the pool hopper gates $17a$ are opened to put the weighed material into the weighing hoppers 18. On the other hand, as one cycle of a weighing operation is completed, the cam plates $22f, 22g$ of the hopper drive unit 22 are made to stop at predetermined positions because the clutches of the clutch/brake mechanisms $22h, 22i$ are turned off while the brakes are put into effect as explained before. Then, the next cycle of weighing peration is started in accordance with the signal coming from the hopper drive control device.

The use of clutch/brake mechanisms in the hopper drive unit is not exclusive. For instance, a similar effect is obtained by the use of a stepping motor, pneumatic cylinder, hydraulic cylinder or the like in place of the clutch/brake mechanism.

Figure 12:
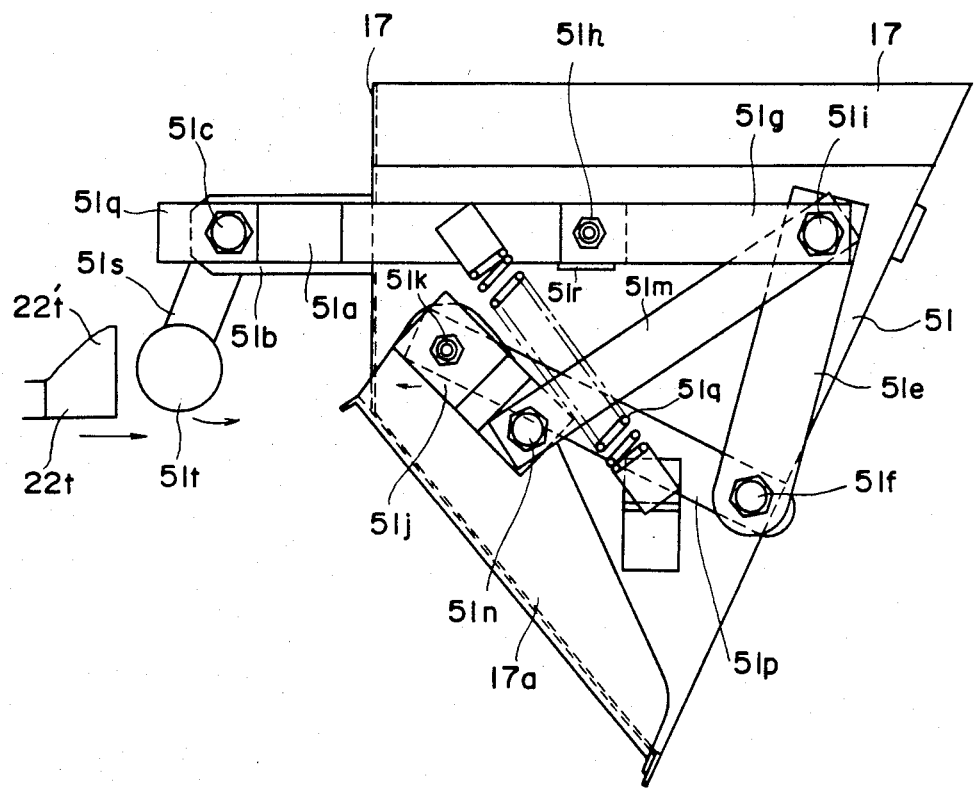
FIGS. 12A and B are a front elevational view of a hopper opening and closing mechanism.
Figure 12:
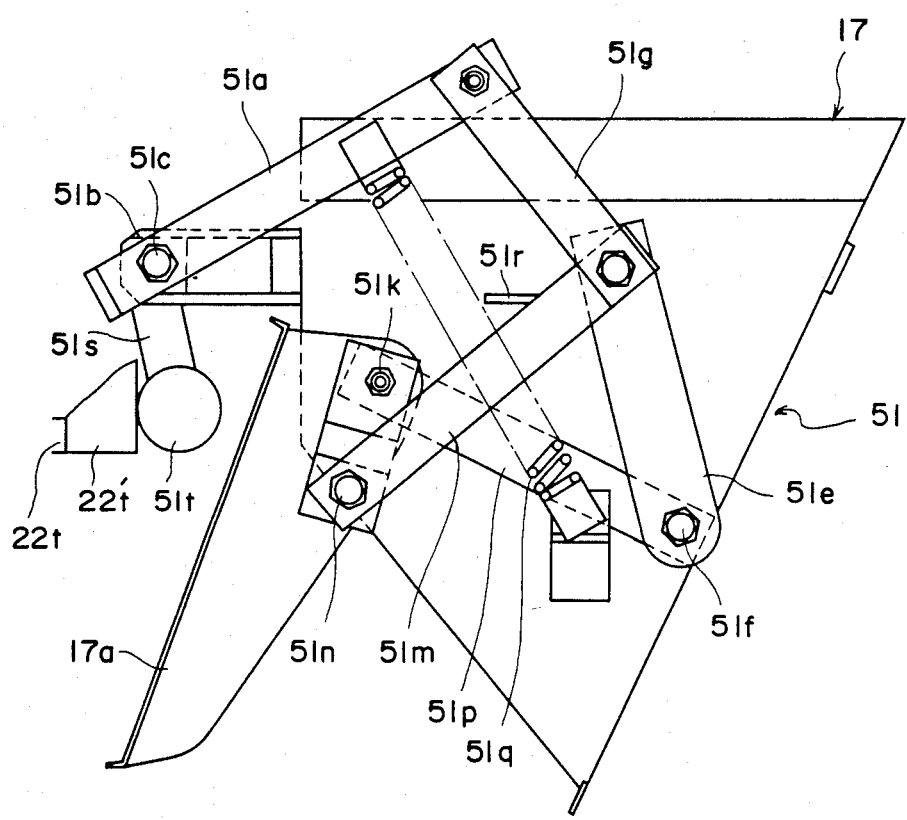

FIG. 12 is a front elevational view of a hopper opening and closing mechanism in accordance with the invention. FIGS. 12 and 13 are a partly-sectioned plan view and a partly-sectioned side elevational view of the hopper opening and closing mechanism shown in FIG. 12. Although the following description is made with specific reference to the opening and closing of the pool hopper gate $17a$, it is to be understood that the same mechanism can be equally applied to the opening and closing of the weighing hopper gate $18a$.

Referring to these figures, a rotary lever $51a$ constituting the opening and closing lever mechanism 51 has one end which is bent in a form like C and pivotally secured by a pivot bolt $51c$ to a bracket $51b$ fixed to a side wall of the pool hopper 17. A reference numeral $51d$ (See FIGS. 13 and 24) denotes a bracket fixed to the edge of the side wall of the pool hopper 17, $51e$ denotes a rocker lever pivoted by a pivot bolt $51f$ attached to the bracket $51d$ to stand upright therefrom, and $51g$ denotes a connecting lever pivotally secured to the end of the rocker lever $51e$ and the other end of the rotary lever $51a$ by means of the pivot bolts $51h, 51i$. Mounting bracket $51j$ are attached to the side walls of the pool hopper gate $17a$. The pool hopper gate $17a$ is swingable around pivot bolts $51k$ by means of which the mounting brackets $51j$ are fixed to the pool hopper gate $17a$. A reference numeral $51m$ denotes an opening lever which is pivotally connected at its one end to the mounting bracket $51j$ through a pivot bolt $51n$ and at the other end pivotally to a pivot bolt $51i$ by which the rocker lever $51e$ and the connecting lever $51g$ are connected to each other.

A reference numeral $51p$ denotes a fixing lever secured at one end to the pivot bolt $51f$ for rocker lever $51e$ and at its other end to the pivot bolt $51k$ for securing the pool hopper gate $17a$. A reference numeral $51q$ designates a spring connected between an intermediate portion of the rotary lever $51a$ and the side wall of the hopper 17, so as to normally bias the rotary lever $51a$ in the clockwise direction. A reference numeral $51r$ designates a stopper fixed to the side wall of the hopper 17. When the rotary lever $51a$ is rotatively biased in the clockwise direction by the force of the spring $51q$, the connection between the rotary lever $51a$ and the connecting lever $51g$ is stopped by the stopper $51r$ so that any further rotation of the rotary lever $51a$ is prevented. In this state, the rotary lever $51a$ and the connecting lever $51g$ form a continuous straight line. A reference numeral $50s$ designates a rocker member pivoted to and suspended from the pivot bolt $51c$ for the rotary lever $51a$. This rocker member $51s$ is provided at its end with a roller $51t$. Each roller $51t$ is disposed to oppose the retractable levers $22t, 22u$. Instead of suspending downwardly, the rocker member $51s$ may protrude upwardly (See FIG. 12A).

In operation, as the material to be weighed is put into the pool hoppers 17 or the weighing hoppers 18, the hopper drive unit 22 (See FIGS. 8 to 11) starts to operate and the retractable lever $22t$ is moved ahead to bring the end $22t'$ of this lever into contact with the roller $51t$ of the downwardly suspended rocker member $51s$ thereby to press and move the roller $51t$. In consequence, the rocker member $51s$ is swung counter-clockwise around the pivot bolt $51c$, so that the rotary lever $51a$ is rotated counter-clockwisely overcoming the force of the spring $51q$ by an angle equal to that of the rocker member $51s$. As a result, the connecting lever $51g$, which is rotating around the pivot bolt $51i$ is pulled by the rotary lever $51a$ and, at the same time, the rocker lever $51e$ is made to rock counter-clockwise around the pivot bolt $51f$. In consequence, the point of connection between the rocker lever $51e$ and the connecting lever $51g$ is moved inward (See FIG. 12B). As a result, the mounting bracket $51j$ is rotated clockwise around the pivot bolt $51k$ so that the pool hopper gate $17a$ fixed to the same shaft as the mounting bracket $51j$ is swung in the opening direction thereby to open the pool hopper 17 (See FIG. 12B). As the material to be weighed is discharged from the pool hopper 17 which is thus opened, the retractable lever $22t$ is retracted so that the roller $51t$ is relieved from the pressing force imposed by the rocker member $51s$ and, accordingly, the rotary lever $51a$ is rotated clockwise around the pivot bolt $51c$ by the force of the spring $51q$ until it is stopped by the stopper $51r$ thereby to displace the connecting lever $51g$ outwardly. In consequence, the rocker lever $51e$ is rotated clockwise around the pivot bolt $51f$ so that the point of connection between the rocker lever $51e$ and the connecting lever $51g$ is displaced outwardly thereby to pull the opening lever $51m$ outwardly. As a result of this motion of the opening lever $51m$, the mounting bracket $51j$ is rotated counter-clockwise around the pivot bolt $51k$ so that the pool hopper gate $17a$ fixed to the same shaft as the mounting bracket $51j$ is swung in the closing direction to close the pool hopper 17 to reset to the initial state shown in FIG. 12A. This operation is repeated cyclically to open and close the pool hopper gate $17a$.

In the described embodiment, the rocker member $51s$ is suspended downwardly. This, however, is not exclusive and the rocker member $51s$ may be mounted to protrude upward. In such a case, the arrangement may be such that the end $22t'$ of the retractable lever $22t$ is formed into a hook-like shape and the pool hopper gate $17a$ is opened and closed by pulling the roller $51t$ inwardly.

As will be understood from the foregoing description, according to the invention, there is provided a combinatorial weighing apparatus in which a hopper drive unit for effecting the opening and closing motions of the pool hopper and the weighing hoppers is disposed at the central portion of the body of the weighing apparatus, within the space substantially surrounded by the pool hoppers and weighing hoppers, to permit all weighing sections to make a common use of a single drive unit including the prime mover such as a geared motor. The combinatorial weighing apparatus of the invention, therefore offers various advantages such as reduction in number of parts and, hence, a reduction in the cost, as well as improvement in the power efficiency. Furthermore, the mounting of the hopper drive unit makes it possible to dispose the pool hoppers and the weighing hoppers at the radially outermost portion of the apparatus as a whole, so that the hoppers are easy to access for demounting to permit easy maintenance work such as cleaning. In addition, since the space which is occupied by a plurality of independent drive units in the known apparatus is saved, the apparatus as a whole can be made compact and the cost is reduced correspondingly.

Furthermore, since a plurality of electromagnetic feeders carrying radial troughs are arranged radially on the upper surface of a disc-shaped feeder base which is common to all distribution supply units, it is possible to eliminate the weight which is required in the conventional apparatus for each distribution supply device and, hence, to arrange a multiplicity of distribution supply devices at a higher density. The use of a single common disc-shaped feeder base further permits a reduction in the number of parts such as coiled springs for mounting the feeder base on the support of the body of the weighing apparatus, contributing a further reduction of the production cost advantageously.

What is claimed is:

1. A combinatorial weighing apparatus, comprising:
   a distribution table for distributing material to be weighed that is supplied thereto;
   distribution supply devices arranged radially around said distribution table and positioned to received said material distributed by said distribution table;
   hoppers fixedly positioned below said distribution supply devices and positioned to received said material from said distribution supply devices;
   weight sensors coupled to said hoppers to weigh the material in the associated hoppers;
   computing means, operatively connected to said weight sensors, for computing the total weight of the material for various combinations of hoppers and selecting the best combination of hoppers which provides a total weight most closely approximating a preset target weight within a predetermined tolerance; and
   hopper drive means, operatively connected to said computing means and engagable with said hoppers, for driving said hoppers on the basis of the best combination thereby to let the hoppers of said best combination discharge said material, said hopper drive means being surrounded by said hoppers and comprising:
   a motor;
   lever mechanisms for and engagable with respective hoppers; and
   transmission mechanisms, coupled to said motor and said lever mechanisms, for respective hoppers and for selectively transmitting the output torque of said motor to said lever mechanisms, where said transmission mechanisms selected on the basis of said best combination are operated to activate the associated lever mechanisms thereby to open said hoppers constituting said best combination.

2. A combinatorial weighing apparatus according to claim 1,
   wherein each of said distribution supply devices comprises:
   an electromagnetic feeder;
   a leaf spring connected to said electromagnetic feeder; and
   a trough mounted above the electromagnetic feeder and coupled thereto through said leaf spring, and
   said weighing apparatus further comprising a single disc-shaped feeder base common to all of said distribution supply devices, and said electromagnetic feeders being positioned and mounted radially on said feeder base at a constant pitch.

3. A combinatorial weighing apparatus according to claim 2, wherein said transmission mechanisms comprise:
   a sun gear fixed to the shaft of said motor;
   rotatable transmission shafts;
   pinions arranged around said sun gear at a regular circumferential pitch, meshing with said sun gear and carried by said rotatable transmission shafts; and
   transmission elements for transmitting the torque from said transmission shafts to the associated lever mechanisms.

4. A combinatorial weighing apparatus according to claim 2, wherein said hopper drive means includes a frame and said apparatus further comprises coiled springs and said feeder base is mounted on the upper surface of the frame of said hopper drive means through said coiled springs.

5. A combinatorial weighing apparatus, comprising:
   a distribution table for distributing material to be weighed that is supplied thereto;
   distribution supply devices arranged radially around said distribution table and positioned to receive the material distributed by said distribution table, each of said distribution supply devices comprising:
   an electromagnetic feeder;
   a leaf spring connected to said electromagnetic feeder; and
   a trough mounted above the electromagnetic feeder and connected thereto through said leaf spring;
   a single disc-shaped feeder base common to all of said distribution supply devices, said electromagnetic feeders being disposed radially on said feeder base at a constant pitch;
   hoppers disposed below said distribution supply devices and positioned to receive the material from said distribution supply devices;
   weight sensors coupled to said hoppers to weigh the material in the associated hoppers;
   computing means, operatively connected to said weight sensors, for computing the total weight of the material for various combinations of hoppers and selecting the best combination of hoppers which provides a total weight most closely approximating a preset target weight within a predetermined tolerance; and
   hopper drive means, operatively connected to said computing means and engagable with said hoppers, for driving said hoppers on the basis of the best combination thereby to let said hoppers of the best combination discharge the material, said hopper drive means being surrounded by said hoppers and comprising:

a motor;

lever mechanisms for and engagable with respective hoppers and each having a cam follower; and transmission mechanisms, coupled to said motor and said lever mechanisms, for respective hoppers and for selectively transmitting the output torque of said motor to said lever mechanisms, where said transmission mechanisms selected on the basis of the best combination are operated to activate the associated lever mechanisms thereby to open said hoppers constituting the best combination, said transmission mechanisms comprising:

a sun gear fixed to the shaft of said motor;

rotatable transmission shafts;

pinions arranged around said sun gear at a regular circumferential pitch and meshing with said sun gear and carried by said rotatable transmission shafts; and transmission elements for selectively transmitting the torque from said transmission shafts to the associated lever mechanisms, each of said transmission elements comprising:

a clutch/brake mechanism fitting around said transmission shaft; and a cam plate associated with said clutch/brake mechanism, said clutch/brake mechanism being operated selectively on the basis of the best combination to permit said cam plate to rotate as a unit with the associated transmission shaft, where said lever mechanism is actuated through the cooperation between the cam follower provided on said lever mechanism and said cam plate.

6. A combinatorial weighing apparatus, comprising:

a distribution table for distributing material to be weighed that is supplied thereto;

distribution supply devices arranged radially around said distribution table and positioned to receive the material distributed by said distribution table;

hoppers disposed below said distribution supply devices and positioned to receive the material from said distribution supply devices;

weight sensors coupled to said hoppers to weigh the material in the associated hoppers;

computing means, operatively connected to said weight sensors, for computing the total weight of the material for various combinations of hoppers and selecting the best combination of hoppers which provides a total weight most closely approximating a preset target weight within a predetermined tolerance;

hopper drive means, operatively connected to said computing means and engagable with said hoppers, for driving said hoppers on the basis of the best combination thereby to let the hoppers of the best combination discharge the material, said hopper drive means having a lever mechanism and being surrounded by said hoppers;

a hopper gate provided on each hopper;

an opening lever for opening and closing each hopper gate and having a pivot point; and a rocker lever pivotally secured to the pivot point of said opening lever and rocked by the operation of the associated lever mechanism of said hopper drive unit to cause a rotation of said opening lever to open said hopper gate.

7. A combinatorial weighing apparatus, comprising:

a distribution table for distributing material to be weighed that is supplied thereto;

distribution supply devices arranged radially around said distribution table and positioned to receive the material distributed by said distribution table, each of said distribution supply devices comprising:

an electromagnetic feeder;

a leaf spring connected to said electromagnetic feeder; and a trough mounted above the electromagnetic feeder and connected thereto through said leaf spring;

a single disc-shaped feeder base common to all of said distribution supply devices, said electromagnetic feeders being disposed radially on said feeder base at a constant pitch;

hoppers disposed below said distribution supply devices and positioned to receive the material from said distribution supply devices;

weight sensors coupled to said hoppers to weigh the material in the associated hoppers;

computing means, operatively connected to said weight sensors, for computing the total weight of the material for various combinations of hoppers and selecting the best combination of hoppers which provides a total weight most closely approximating a preset target weight within a predetermined tolerance;

hopper drive means, operatively connected to said computing means and engagable with said hoppers, for driving said hoppers on the basis of the best combination thereby to let the hoppers of the best combination discharge the material, said hopper drive means having a lever mechanism and being surrounded by said hoppers;

a hopper gate provided on each hopper;

an opening lever for opening and closing each hopper gate and having a pivot point; and a rocker lever pivotally secured to the pivot point of said opening lever and rocked by the operation of the associated lever mechanism of said hopper drive unit to cause a rotation of said opening lever to open said hopper gate.

8. A combinatorial weighing apparatus, comprising:

fixed position weighing means for holding and weighing articles to be discharged therefrom in a combination closest to a target weight; and an integral distribution and control unit comprising:

distribution means for distributing articles to be weighed by said fixed position weighing means;

fixed position storage means for receiving, storing and discharging the distributed articles into said weighing means; and drive means for operating said storage means to discharge articles into said weighing means and for operating said weighing means to discharge the combination, said distribution means and said storage means being mounted on said drive means, said distribution means being positioned over said drive means and said drive means being positioned adjacent to and in engagable contact with said weighing means.

9. An apparatus according to claim 11, wherein said storage means comprises pool hoppers, said drive means comprises a hopper drive unit, and said distribution means comprises:
   springs mounted on said hopper drive unit;
   a feeder base mounted on said springs;
   a vibratory distribution table mounted on said feeder base; and
   vibratory distribution troughs positioned to carry items from said vibratory distribution table to said pool hoppers and mounted on said feeder base.

10. An apparatus according to claim 9, wherein said feeder base is a single disc-shaped feeder base, said distribution table is conically shaped, said vibratory distribution troughs are arranged radially around said distribution table and said pool hoppers are arranged radially out from respective vibratory distribution troughs.

11. An apparatus according to claim 10, wherein said hopper drive unit is positioned inside a circle defined by said pool hoppers and said weighing means.

12. An apparatus according to claim 8, wherein said hopper drive means comprises:
   a motor;
   drive levers engagable with said pool hoppers and said weighing means; and
   engagement means, coupled to said motor and said drive levers, for operating said drive levers to discharge the combination from said weighing means and to reload said weighing means from said pool hoppers.

13. An apparatus according to claim 12, wherein said weighing means comprises weighing hoppers each having a discharge gate engagable with an associated drive lever.

* * * * *

UNITED STATES PATENT AND TRADEMARK OFFICE
CERTIFICATE OF CORRECTION

PATENT NO. : 4,497,385

DATED : Feb. 5, 1985

INVENTOR(S) : SASHIKI

It is certified that error appears in the above-identified patent and that said Letters Patent is hereby corrected as shown below:

Col. 2
Line 58, "interfered" s/b --interferred--.

Col. 3
Line 49, "in" s/b --of--.

Col. 5
Line 53, "ends" s/b --end--.

Col 6
Line 7, delete "22t,22y,"; after levers insert --22t, 22u--;
Line 33, "trnasmi-" s/b --transmi- --.

Col. 7
Line 19, "peration" s/b --operation--.

Col. 9
Line 39, "received" s/b --receive--;
Line 42, "received" s/b --receive--.

Col. 13
Line 1, "11'" s/b --8--.

Signed and Sealed this

Third Day of September 1985

[SEAL]

Attest:

DONALD J. QUIGG

*Attesting Officer*   *Acting Commissioner of Patents and Trademarks - Designate*